United States Patent
Tokutsu

(10) Patent No.: US 7,633,657 B2
(45) Date of Patent: Dec. 15, 2009

(54) IMAGE FORMING APPARATUS

(75) Inventor: Akihito Tokutsu, Kanawaga-ken (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 814 days.

(21) Appl. No.: 11/371,437

(22) Filed: Mar. 8, 2006

(65) Prior Publication Data

US 2007/0211312 A1    Sep. 13, 2007

(51) Int. Cl.
*H04N 1/04* (2006.01)
*G03G 15/20* (2006.01)
*B41F 23/04* (2006.01)

(52) U.S. Cl. .................. 358/496; 358/498; 399/69; 101/487

(58) Field of Classification Search ............ 399/69, 399/70; 381/397; 101/40, 40.1, 487; 348/748; 438/540; 358/474, 479, 486, 497, 496, 498
See application file for complete search history.

(56) References Cited

U.S. PATENT DOCUMENTS

| | | | | |
|---|---|---|---|---|
| 4,924,320 A | * | 5/1990 | Tanaka et al. | 358/296 |
| 5,095,371 A | * | 3/1992 | Tanaka et al. | 358/300 |
| 6,186,683 B1 | * | 2/2001 | Shibuki | 400/120.08 |
| 2003/0156150 A1 | * | 8/2003 | Hayashi et al. | 347/19 |
| 2003/0182520 A1 | * | 9/2003 | Tsunemiya et al. | 711/154 |
| 2004/0113581 A1 | * | 6/2004 | Kobayashi et al. | 318/685 |
| 2004/0190084 A1 | * | 9/2004 | Shirai | 358/474 |
| 2005/0062792 A1 | * | 3/2005 | Kojima | 347/23 |
| 2005/0177065 A1 | * | 8/2005 | Ghajar | 600/558 |
| 2006/0197795 A1 | * | 9/2006 | Takatsuka et al. | 347/19 |

FOREIGN PATENT DOCUMENTS

| | | |
|---|---|---|
| JP | 2003-84650 | 9/2001 |
| JP | 2004-18198 | 6/2002 |

* cited by examiner

*Primary Examiner*—Jerome Grant, II
(74) *Attorney, Agent, or Firm*—Patterson & Sheridan, LLP

(57) ABSTRACT

According to an embodiment of the present invention, an image forming apparatus having an automatic document carrier device including a plurality of sensors arranged in a path where source documents to be read are carried; a plurality of motors configured to detect the positions of the source documents by these sensors and to carry the source documents at a predetermined speed; a cooling fan to be rotated to reduce the ambient temperature; a fan motor configured to drive the cooling fan; and a carrier control unit configured to control the plurality of sensors, the plurality of motors and the fan motor, wherein the carrier control unit detects passage of the source documents by any of the plurality of sensors, estimates a time when the source documents are discharged into the discharge tray, and stops the fan motor around the estimated time.

9 Claims, 7 Drawing Sheets

IMAGE FORMING APPARATUS

BACKGROUND OF THE INVENTION

1. Field of the Invention

The present invention relates to an image forming apparatus having an automatic document carrier device.

2. Description of the Related Art

In the related art, a document carrier device in an image forming apparatus or the like is required to carry source documents or sheets of paper to a predetermined position to read the source documents, and then discharge the same. Various types of motors are employed for carrying the source documents or sheets of paper and the motors generate heat. Since heat is also generated in various electric components in the process of image formation, a cooling fan is used for restraining heat generation, and a fan motor is used for driving the cooling fan.

A paper carrier device in which the cooling fan is integrally provided with a rotating body is stated in JP-A-2004-18198, and an image forming apparatus for switching or changing a revolving speed of the cooling fan according to the setting of the recording velocity is disclosed in JP-A-2003-84650.

In the related art, the fan motor is continuously driven even after the contents of the source documents are read and the source document is discharged, and hence normally the cooling fan is still rotating even after other motors or the like are stopped. Therefore, the noise of the wind is generated, which causes undesired sound.

BRIEF SUMMARY OF THE INVENTION

In view of such problems of the related art as described above, it is an object of the invention to provide an image forming apparatus in which the noise of a cooling fun can be minimized.

According to an aspect of the invention, there is provided an image forming apparatus having an automatic document carrier device including: a plurality of sensors arranged in a path where source documents to be read are carried; a plurality of motors configured to detect the positions of the source documents by these sensors and to carry the source documents at a predetermined speed; a cooling fan to be rotated to reduce the ambient temperature; a fan motor configured to drive the cooling fan; and a carrier control unit configured to control the plurality of sensors, the plurality of motors and the fan motor, wherein the carrier control unit detects passage of the source documents by any of the plurality of sensors, estimates a time when the source documents are discharged into the discharge tray, and stops the fan motor around the estimated time.

According to another aspect of the invention, since the fan motor to drive the cooling fan is stopped after having discharged the source documents or the like, the noise generated by the rotation of the cooling fan is restrained, whereby an image forming apparatus in which the noise is not dragged on can be obtained.

DETAILED DESCRIPTION OF THE INVENTION

Figure 1:
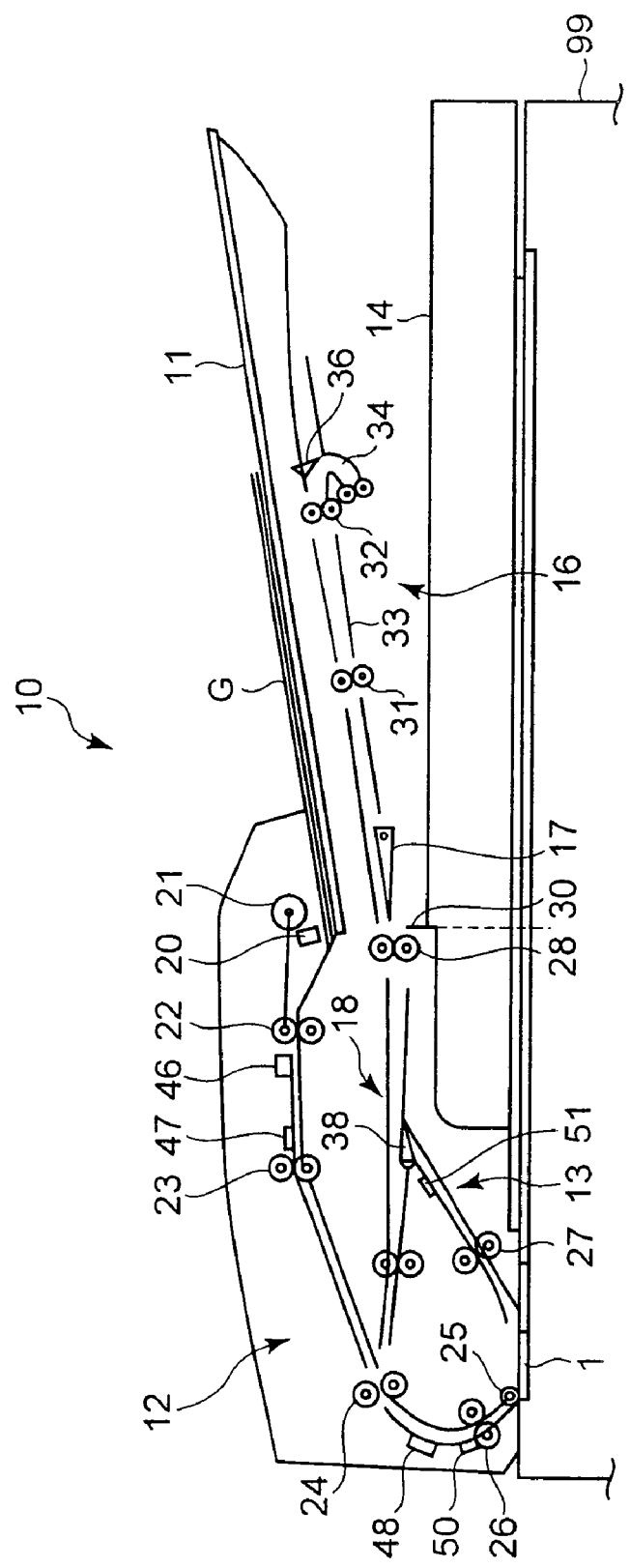
FIG. 1 is a drawing showing a structure of an automatic document carrier device in an image forming apparatus according to an embodiment of the invention.

Referring now to the drawings, an embodiment of the invention will be described below.

FIG. 1 is a schematic block diagram showing mainly a carrier mechanism and a sensor detection mechanism of an automatic document carrier device 10 of an image forming apparatus according to an embodiment of the invention. Source documents G described here are composed of a plurality of sheets.

The automatic document carrier device 10 roughly includes a paper feed tray 11 for placing the source documents G thereon with a front face directed upward, a document feed path 12 as document feed means for feeding the source documents G to a reading unit 1 from the paper feed tray 11, a document discharge path 13 as document discharge means for discharging the source documents G after having read from the reading unit 1; a first reversing gate 17 for distributing the source documents discharged from the document discharge path 13 toward a discharge tray 14 or toward the reversing path 16, and a secondary carrier path 18 for supplying the source documents G redirected from the reversing path 16 and reversed to the reading unit 1 again.

An empty sensor 20 for detecting presence of the source documents G is provided above the paper feed tray 11. The document feed path 12 includes a pickup roller 21 for taking the source documents G from the paper feed tray 11, paper separation rollers 22 for preventing the source documents G from being caught two sheets together, registration rollers 23 for aligning leading edges of the source document G, intermediate rollers 24 for transmitting carrying of the source documents, document holding roller 25, and before-reading rollers 26.

The document discharge path 13 includes after-reading rollers 27, and paper discharging rollers 28 that are rotated in the normal direction. An alignment wall. 30 is provided on the paper discharge tray 14 substantially perpendicular to a side end of the first paper discharge roller 28. The alignment wall 30 aligns the source documents G by abutting the distal ends of the source documents. The reversing path 16 includes first and second reversing rollers 31, 32 that are reciprocally rotated, a turn discharge path 34 formed into a U-shape in cross-section for making the source documents G to U-turn and discharging the same toward the discharge tray 14 is formed at a midsection of a carrier path 33 of the reversing path 16. The reversing gate includes a second reversing gate 36, and a third reversing gate 38 in addition to the first reversing gate 17.

A length sensor 46 for detecting the length of the source document G, a registration (RGT) sensor 47 for detecting arrival of the source document G to the registration rollers 23, an intermediate sensor 48 for detecting drive timing of the paper feed motor 40, described later, and the READ motor 41, and a before-reading sensor 50 for detecting the drive timing of a paper discharge motor 42 are arranged in the document feed path 12. The paper discharge sensor 51 for detecting the drive timing of the READ motor 41 and the paper discharge motor are arranged in the document discharge path 13.

Figure 2:
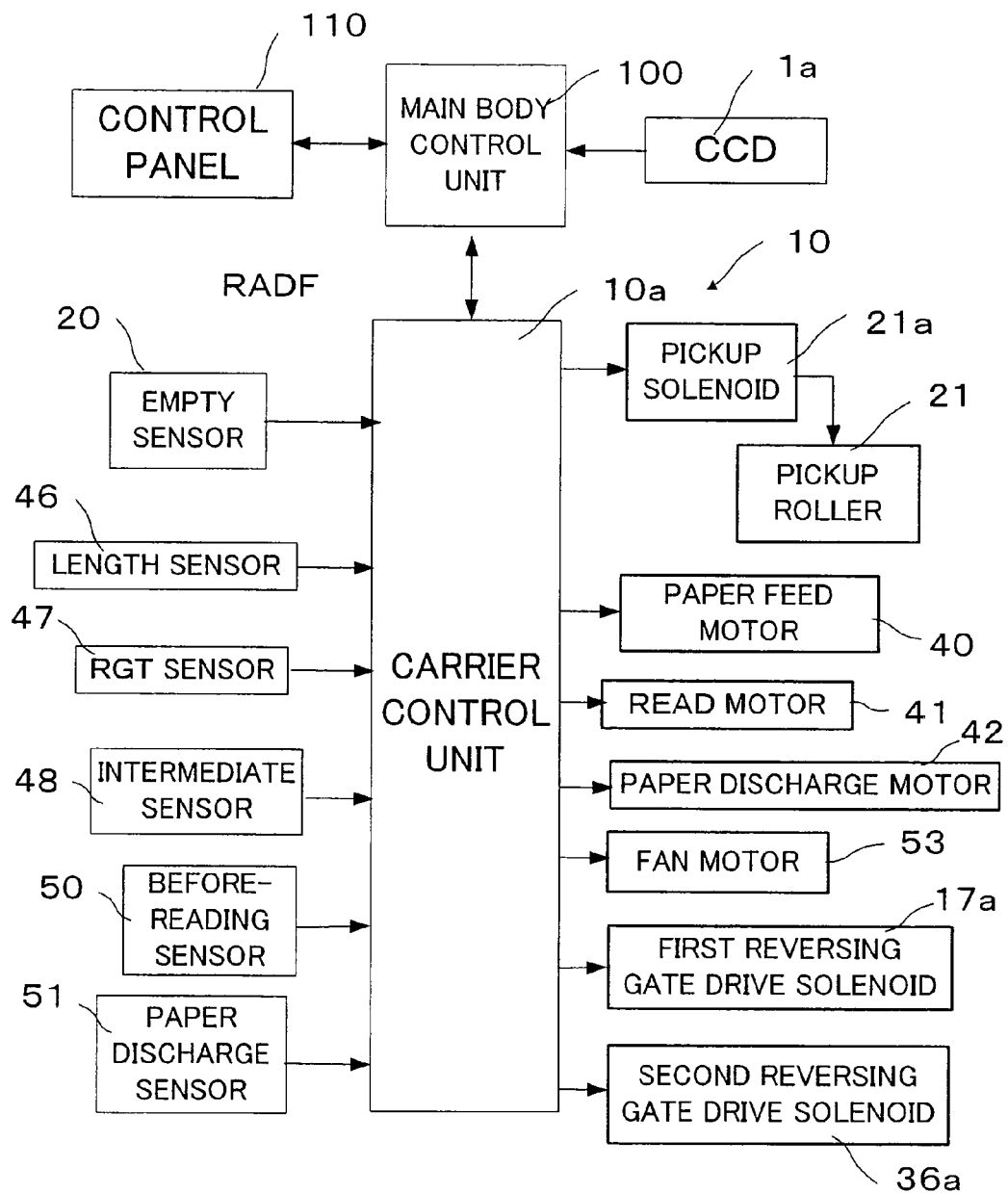
FIG. 2 is a drawing showing a control system of a document carrier mechanism of the automatic document carrier device according to the embodiment of the invention.

FIG. 2 shows a block diagram of a control system of the automatic document carrier device 10. A control panel 110 of an image forming apparatus is connected to a main body control unit 100 for controlling the entire image reading device 99 having the reading unit 1. Image information read by a CCD (Charge Coupled Device) 1a of the reading unit 1 is entered into the main body control unit 100. The main body control unit 100 controls a carrier control unit 10a, which is a control unit of the automatic document carrier device 10 via an input/output interface 101.

The empty sensor 20, the length sensor 46, the RGT sensor 47, the intermediate sensor 48, the before-reading sensor 50, and the paper discharge sensor 51 are connected to the input side of the carrier control unit 10a. A pickup solenoid 21a for oscillating the pickup roller 21, the paper feed motor 40, the READ motor 41, the paper discharge motor 42, a first reversing gate drive solenoid 17a for driving the first reversing gate 17, a second reversing gate drive solenoid 36a for driving the second reversing gate 36 and the fan motor 53 are connected to the output side of the carrier control unit 10a.

Figure 3A:
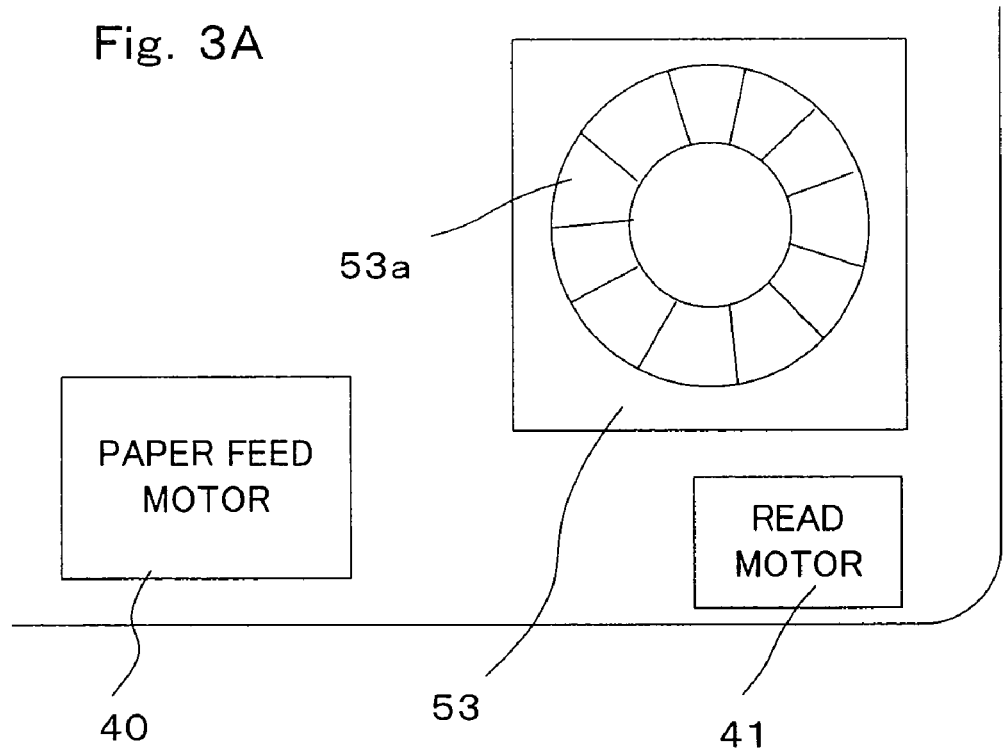
FIG. 3A is a drawing showing a positional relation among a paper feed motor 40 in the automatic document carrier device, a READ motor 41, a cooling fan 53a, and a fan motor 53 according to the embodiment of the invention.

FIG. 3A shows a relation among the three motors viewed from the top of the automatic document carrier device 10. In other words, the paper feed motor 40, the READ motor 41, and the fan motor 53 for driving the cooling fan 53a are disposed in a positional relationship as shown in FIG. 3A.

The pickup roller 21 moves downward when the pickup solenoid 21a is turned ON. The pickup roller 21 and the paper separation rollers 22 rotate when the paper feed motor 40 rotates in the normal direction. The RGT rollers 23 rotate when the paper feed motor 40 rotates in the opposite direction.

The intermediate rollers 24, the before-reading rollers 26 and the after-reading rollers 27 rotate when the READ motor 41 rotates in the normal direction. The paper discharge rollers 28, the first reversing rollers 31, and the second reversing rollers 32 are driven when the paper discharge motor 42 rotates. The first reversing gate 17 and the second reversing gate 38 are configured respectively to be switched by the first reversing gate drive solenoid 17a and the second reversing gate drive solenoid 36a. Increase in temperature that occurs due to motors or electrical parts in the automatic document carrier device 10 is restrained by the rotation of the cooling fan 53a caused by the fan motor 53.

Figure 3B:
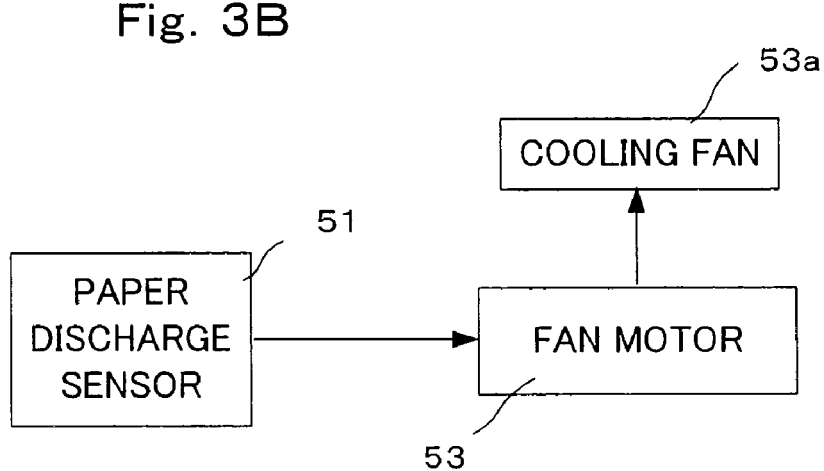
FIG. 3B is a drawing showing an electrical relation among a paper discharge sensor 51, the fan motor 53, and the cooling fan 53a in the automatic document carrier device according to the embodiment of the invention.

FIG. 3B shows an electrical relation among the paper discharge sensor, the fan motor 53 and the cooling fan 53a in this embodiment of the invention. When the source documents that are composed of a plurality of sheets are to be fed, if the paper discharge sensor 51 detects the trailing edge of the last page, a signal that indicates this detection is sent to the fan motor 53 to stop the fan motor. Since the cooling fan 53a is driven by the fan motor 53, the rotation of the cooling fan 53a stops. Other driving motors are stopped after having discharged the last page completely.

Figure 4:
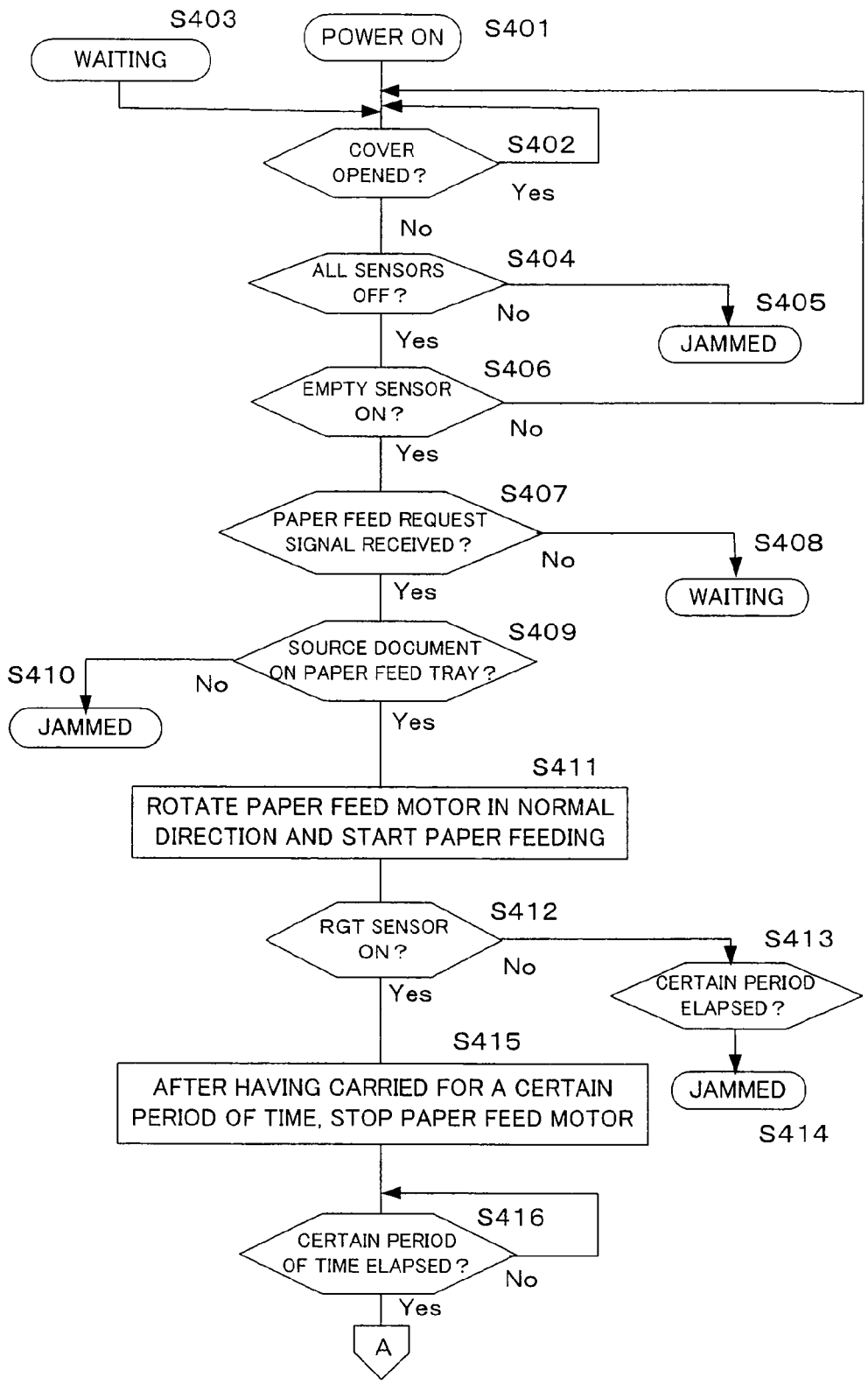
FIG. 4 is a flowchart for explaining a first series of actions of the automatic document carrier device according to the embodiment of the invention.
Figure 5:
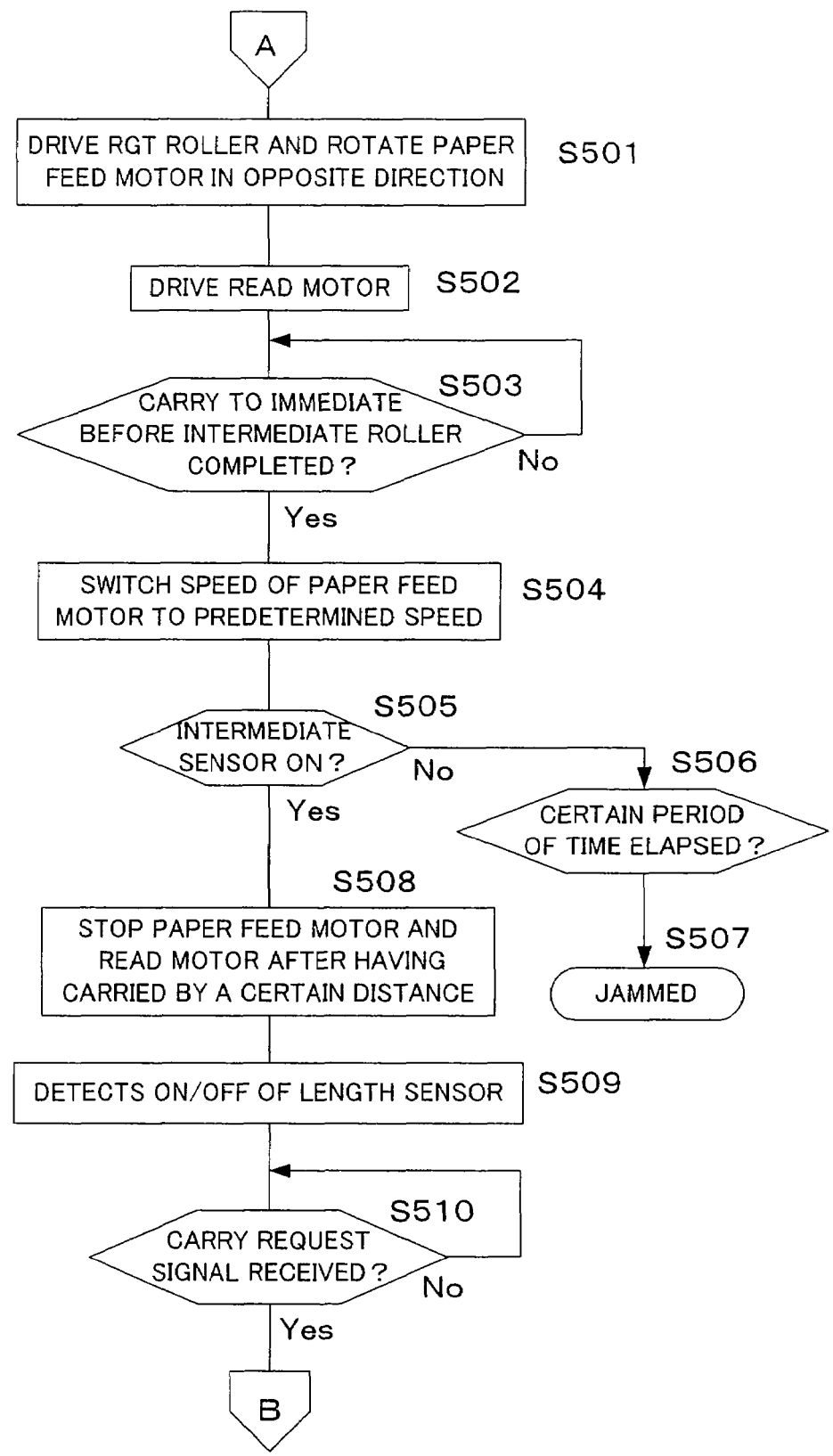
FIG. 5 is a flowchart for explaining a second series of actions of the automatic document carrier device following after the actions shown in FIG. 4.

Referring now to FIG. 4 and FIG. 5, an operation of this embodiment of the invention will be described in detail. When the power source is turned ON in the Step S401, whether or not a cover of the document reading device is opened is detected in Step S402. Whether or not the cover is opened in Step S402 is detected also when waiting in Step S403. When it is not opened, the procedure goes to the next step, that is, Step S404, where whether or not all the sensors are in OFF state is detected. When there is any sensor which is in the ON state, it is determined that the source document is jammed in Step S405, that is, jamming is occurred.

When all the sensors are turned OFF in Step S404, whether or not the empty sensor 20 is in the ON state is detected in Step S406. If the empty sensor 20 is not in the ON state, the procedure returns to Step S402. In other words, when the source document is set to the paper feed tray 11, the empty sensor 20 is turned ON and a document set ON signal is sent to the main body of the image forming apparatus, and waits for a paper-feed request signal from the main body.

Therefore, when the empty sensor 20 is in the ON state, whether or not the paper feed requesting signal is received is detected in Step S407. When the empty sensor 20 is in the OFF state, it enters the waiting state in Step S408.

When having received the paper feed requesting signal in Step S407, whether or not there is a source document on the paper feed tray 11 is detected in Step S409, and when there is no source document on the paper feed tray 11, it is determined to be the jammed state.

When the paper feed requesting signal is received from the main body, and when the presence of the source document on the paper feed tray 11 is detected in Step S409, the pickup solenoid 21a is turned on in Step S411, and then the paper feed motor 40 is rotated in the normal direction, whereby the pickup roller 21 and the paper separation rollers 22 rotate to start paper feeding operation. At the same time, the fan motor 53 is driven to rotate the cooling fan 53a.

In Step S412, whether or not the RGT sensor 47 is turned ON is detected. When a relatively long certain time period is elapsed since the RGT sensor 47 is turned ON in Step S413, it is determined that jamming is occurred in Step S414.

When the fact that the RGT sensor 47 is turned ON is detected in Step S412, a predetermined number of pulses are supplied to the paper feed motor 40 to carry the source document for a certain time period, the paper separation rollers 22 are driven for aligning the source document and then the paper feed motor 40 is stopped.

Whether or not a certain time period is elapsed is measured in Step S416 and when the certain time period is elapsed, the procedure goes to Step S501 shown in FIG. 5 where the paper feed motor 40 is rotated in the opposite direction, and the RGT rollers 47 are rotated to carry the source document. Carrying of the source document is done at an adequate speed considering a first copying time. In other words, a first page of the source document is carried at a maximum reading speed, and the second and subsequent pages are carried at speeds calculated on the basis of the reading speed of previous source document.

The READ motor 41 is also activated at substantially the same timing as driving of the RGT roller 47. The speed of the RGT rollers 47 are adjusted so as to be the same speed as the intermediate rollers 24 at a time point when the source document is carried from activation of the paper feed motor by an amount corresponding to one pulse, that is, immediately before the intermediate rollers 24. The first page of the source document is carried at a maximum reading speed, and the second and subsequent pages are carried at speeds requested from the main body.

When the fact that the source document is carried to a position immediately before the intermediate rollers 24 in Step S503, the speed of the paper feed motor 40 is switched to a predetermined speed in Step S504. In other words, the speed of the paper feed motor 40 is switched so that the first page of the source document is carried at a maximum reading speed, and the second and subsequent pages are carried at speeds requested from the main body.

Then, whether or not the intermediate sensor 48 is turned ON is detected in Step S505. When the intermediate sensor 48 is not turned ON, the fact that a relatively long certain period of time has elapsed is detected in Step S506, and it is determined that jamming is occurred in Step S507.

When it is determined that the intermediate sensor 48 is turned ON in Step S505, the READ motor 41 and the paper feed motor 40 are stopped after having supplied a predetermined number of pulses to the paper feed motor 40 in Step S508 to carry the source document by a predetermined distance.

Figure 6:
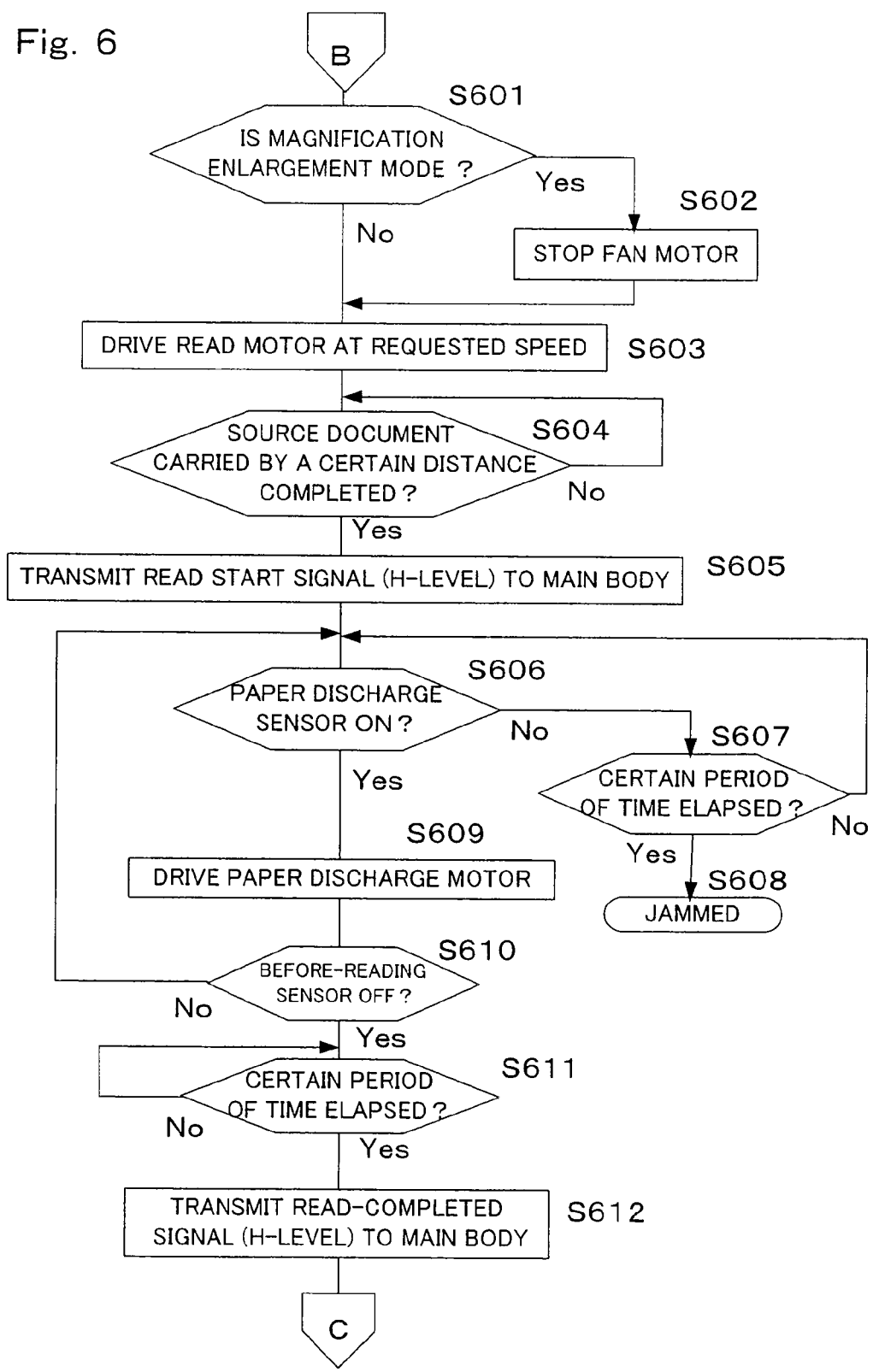
FIG. 6 is a flowchart for explaining a third series of actions of the automatic document carrier device shown in FIG. 5.

In Step S509, whether the length sensor 46 is ON or OFF is detected. In the case in which the length sensor 46 is OFF, it is determined that the source document is a standard size. In Step S510, whether or not the carry request signal is received is detected, and if this signal is received, the procedure goes to Step S601, shown in FIG. 6. The carrying speed of the source document thereafter is set to a speed and a magnification according to an instruction from the main body, and whether or not the fan motor is continuously driven is determined accordingly. In Step S601, whether or not the magnification requested from enlargement mode is detected. When the requested mode is an enlargement mode, the fan motor 53 is stopped in Step S602 since the speed is low. In the next step, that is, in Step S603, the READ motor 41 is driven at a requested speed. When the source document is carried by the certain distance completely in Step S604, a read start signal (H level) is transmitted to the main body in Step S605.

The READ motor 41 rotates in the normal direction, the paper feed motor 40 rotates in the reverse direction, and the RGT roller 47 and the RGT roller 47 rotate, whereby the source document reading action is started. After the trailing edge of the source document has passed the RGT roller 47, if there is a next source document, the paper feed motor is stopped once, whereby the paper feed motor starts rotation in the normal direction, and the pickup roller 21 and the paper separation rollers 22 rotate to start pre-feeding of the next source document.

In parallel with the operation described above, the paper discharge roller is rotated by the paper discharge motor to control paper discharging. In other words, whether or not the paper discharge sensor 51 is turned ON is detected in Step S606. When it is not turned ON, whether or not the certain period of time has elapsed is detected in Step S607, and when a predetermined time period has elapsed, it is determined that the jamming is occurred.

On the other hand, when the paper discharge sensor 51 is ON, the paper discharge motor 42 is activated in Step S609, and whether or not the before-reading sensor 50 is OFF is detected in Step S610. When the before-reading sensor is OFF, whether or not the certain period of time has elapsed is detected in Step S611. When the certain time period has elapsed, the reading end signal (L level) is transmitted to the main body in Step S612.

Figure 7:
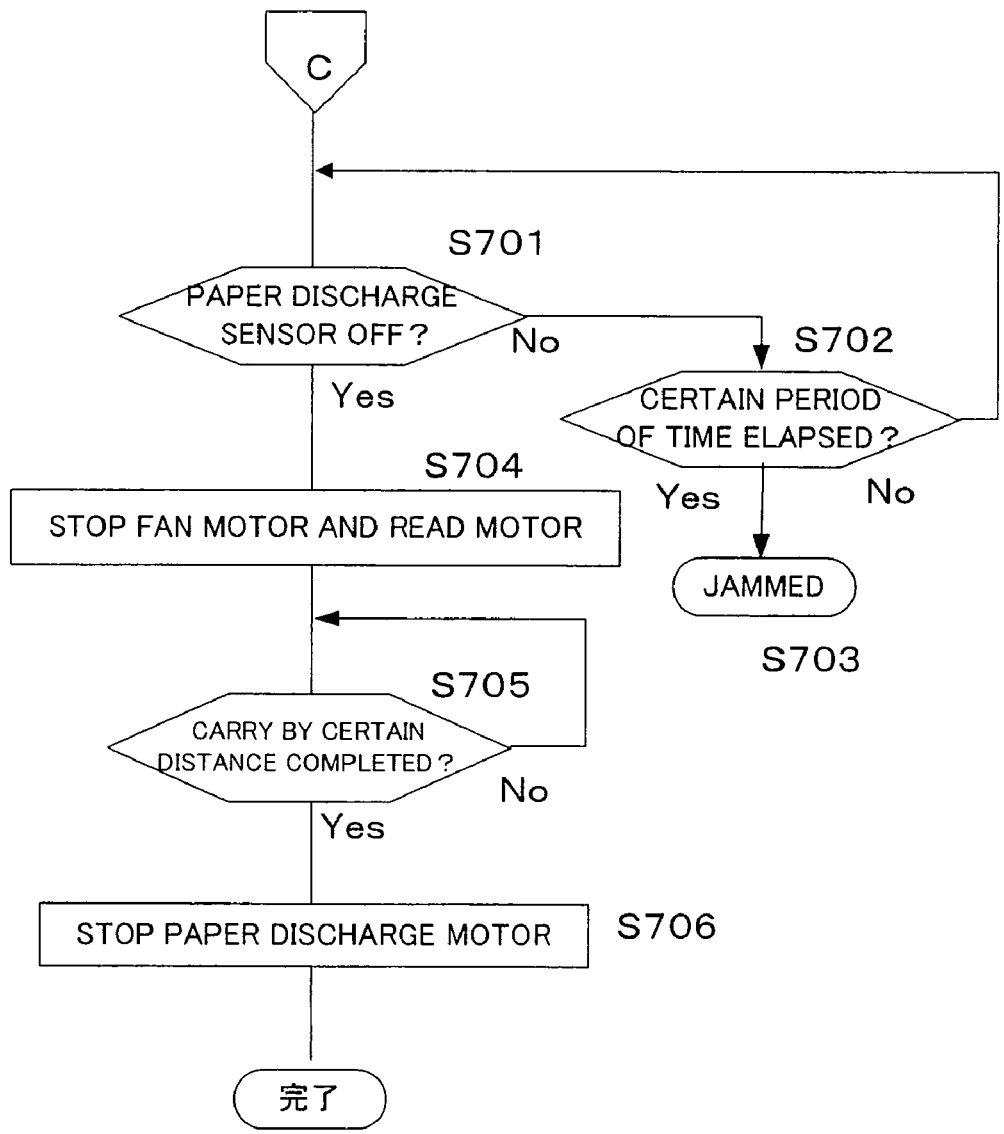
FIG. 7 is a flowchart for explaining a fourth series of actions of the automatic document carrier device following after the actions shown in FIG. 6.

In the next step, that is, in Step S701 shown in FIG. 7, whether or not the paper discharge sensor is OFF is detected. If it is not OFF, when the certain period of time has elapsed in Step S702, it is determined that the jamming is occurred in Step S703.

When it is detected that the paper discharge sensor 51 is OFF, the fan motor 53 and the READ motor 41 are stopped in Step S704. When it is detected that the source document has been carried completely by the certain distance in Step S705, the paper discharge motor is stopped in Step S706.

When the last page of the source documents is fed, the fan motor 53 is stopped at a moment when the paper discharging sensor 51 detects the trailing edge of the source document, and the source document is carried by a certain distance with a certain number of pulses fed thereafter. Then, when the source document is completely discharged, other drive motors are stopped.

In the above-described embodiment, the case in which the plurality of sheets of source documents are read consecutively has been described. However, there is a case in which only a single page of source document is read. In such a case, the single page of the source document is treated as the last page of the plurality of sheets of source documents.

In the related art, the fan motor is stopped simultaneously with the drive motor when the last page of the source document is completely discharged. Therefore, uncomfortable sound of the cooling fan that rotates through inertia is generated. However, according to the embodiment of the invention described above, the fan motor 53 is stopped when the trailing edge of the last page of the source document is detected. Therefore, the sound of the fan motor 53 cannot be heard due to the sound of the drive motor, and when the drive motor is stopped, the fan motor is already stopped. In this state, since the cooling fan 53*a* is not rotated, the uncomfortable sound does not stay in the ear any longer.

According to the above-described embodiment, when the source documents are carried at a low speed, although it is not necessary to supply much electrical current to the drive motor, and hence the temperature thereof does not rise up, the cooling fan was rotated unnecessarily in the related art. Accordingly, the power is consumed more than necessary, and the noise is generated. Since the drive sound is lowered when the source documents are carried at a low speed, the rotating sound of the cooling fan is quite sensible. However, according to the embodiment of the invention, since the fan motor is stopped when the source documents are carried at the low speed, the power is prevented from being consumed unnecessarily, and the noise can be reduced.

In the above-described embodiment, the fan motor 53 is stopped by detecting the last page, that is, by detecting that there is no page following subsequently by the paper discharge sensor 51. It is also possible to stop the fan motor by estimating the time when the trailing edge of the source document is discharged without detecting the trailing edge of the last page of the source documents.

However, in the invention, it is also possible to detect that there is no subsequent source document by the other sensors, and stop the fan motor 53 when the predetermined time period has elapsed. For example, a configuration in which the before-reading sensor 50 detects that the last page of the source document has passed, and the time of the day when the page in question is discharged is estimated from the time of the day of the passage thereof, whereby the fan motor 53 is stopped at the estimated time is also applicable. It is also possible to estimate the time of the day when the source document is discharged from the time of the day when the last page of the source documents has passed through the RGT sensor to stop the fan motor before or after the estimated time of the day.

When the fan motor 53 is stopped, the rotation of the cooling fan 53*a* is stopped. There is a case in which the period from the stop of the fan motor 53 to the stop of rotation of the cooling fan may vary depending on the standard such as the size of the cooling fan. When the stop of rotation of the cooling fan is likely to be later than the stop of other drive motors, the cooling fan is recommended to be stopped before discharge of the last page of the source document. In the case described above, the fan motor 53 can be stopped before, for example, several ms before discharge of the last page by detecting the last page of the source documents before the paper discharge sensor 51 in the document carrier path, not by the paper discharge sensor 51, but by the before-reading sensor 50 or the like.

When predetermined conditions are satisfied, it is possible to configure to delay the stop of the fan motor by a predetermined time period when the temperature in the automatic document carrier device is higher than the predetermined temperature, that is, to detect the last page of the source document and stop the fan motor when the ambient temperature is lower than the predetermined temperature.

In the above-described embodiment, as shown in FIG. 2, the carrier control unit 10a detects arrival of the source documents by a plurality of sensors arranged in the carrier path of the source documents to be read to drive any one of the plurality of motors according to the position of arrival thereof, and hence the position of arrival of the source documents is always detected. Therefore, it is possible to estimate the time when the source document is discharged into the discharge tray according to the position of arrival thereof, and stop the fan motor around the estimated time.

The cooling fan may be in the automatic document carrier device and may be in the main body. What is essential in the invention is to stop the fan motor which rotates the cooling fan.

The invention is not limited to the above described embodiment, and maybe modified variously within the range of the technical idea in the invention.

What is claimed is:

1. An image forming apparatus having an automatic document carrier device comprising:
   a plurality of sensors arranged in a path where source documents to be read are carried;
   a plurality of motors configured to detect the positions of the source documents by these sensors and to carry the source documents at a predetermined speed;
   a cooling fan to be rotated to reduce the ambient temperature;
   a fan motor configured to drive the cooling fan; and
   a carrier control unit configured to control the plurality of sensors, the plurality of motors and the fan motor,
   wherein the carrier control unit detects passage of the source documents by any of the plurality of sensors, estimates a time when the source documents are discharged into the discharge tray, and stops the fan motor around the estimated time.

2. The image forming apparatus according to claim 1, wherein the sensor for detecting passage of the source documents for estimating the time when the source documents are discharged into the discharge tray is a discharge sensor.

3. The image forming apparatus according to claim 1, wherein the sensor configured to detect passage of the source documents to estimate the time when the source documents are discharged into the discharge tray is a before-reading sensor to be arranged at a position before reading of the source document.

4. The image forming apparatus according to claim 1, wherein the sensor configured to detect passage of the source documents to estimate the time when the source documents are discharged into the discharge tray is a registration sensor configured to detect arrival of the source documents.

5. An image forming apparatus comprising:
   a cooling fan to be rotated to lower the ambient temperature;
   a fan motor configured to drive the cooling fan;
   a paper feed tray on which a plurality of sheets of the source documents to be read are placed;
   a plurality of passage detection sensors disposed in the path to carry the source documents to detecting passage of the source document;
   a plurality of motors configured to carry the source documents at a predetermined speed by the output from the passage detection sensors;
   a paper discharge tray to which the source document is discharged after having read; and
   a paper discharge sensor configured to detect the source document discharged to the paper discharge tray,
   wherein the fan motor is stopped when the paper discharge sensor detects the last page of the source documents.

6. An image forming apparatus, according to claim 5, further comprising:
   a detector configured to detect the ambient temperature,
   wherein the paper discharge sensor detects the last page of the source documents and the detector detects that the temperature is lower than the predetermined temperature and stops the fan motor.

7. An image forming apparatus including a cooling fan to be rotated to lower the ambient temperature;
   a fan motor configured to drive the cooling fan;
   a paper feed tray on which a plurality of sheets of source documents to be read are placed;
   a plurality of passage detection sensors arranged in a path to carry the source documents for detecting passage of the source document;
   a plurality of motors configured to carry the source documents at a predetermined speed according to outputs from the passage detection sensors;
   a paper discharge tray to which the source documents are discharged after having read; and
   a paper discharge sensor configured to detect the source documents to be discharged to the paper discharge tray,
   wherein when one of the passage detection sensors detects the last page of the source document, the time when the last page in question of the source documents is discharged to the paper discharge tray is estimated to stop the fan motor around the estimated time.

8. The image forming apparatus according to claim 7, wherein the passage detection sensors configured to detect the passage of the last page of the source documents is a before-reading sensor arranged to a position before reading the source document.

9. The image forming apparatus according to claim 7, wherein the passage detection sensors configured to detect the passage of the last page of the source documents are registration sensors configured to detect arrival of the source documents.

* * * * *